United States Patent
Laurent

(10) Patent No.: US 6,929,320 B2
(45) Date of Patent: Aug. 16, 2005

(54) AIRCRAFT SEAT WITH SYNCHRONIZED BACK REST AND LEG REST

(75) Inventor: Ligonniere Laurent, Poncet la Ville (FR)

(73) Assignee: Societe Industrielle et Commerciale de Materiel Aeronautique, Issoudun (FR)

(*) Notice: Subject to any disclaimer, the term of this patent is extended or adjusted under 35 U.S.C. 154(b) by 0 days.

(21) Appl. No.: 10/408,579

(22) Filed: Apr. 8, 2003

(65) Prior Publication Data

US 2003/0189360 A1 Oct. 9, 2003

(30) Foreign Application Priority Data

Apr. 8, 2002 (FR) .......................................... 02 04374

(51) Int. Cl.$^7$ ................................................ A47C 1/02
(52) U.S. Cl. .................... 297/83; 297/316; 297/354.13; 297/342
(58) Field of Search .............................. 297/84, 83, 86, 297/423.3, 423.26, 68, 89, 329, 354.13, 316, 342, 423.1, 423.19

(56) References Cited

U.S. PATENT DOCUMENTS

| 2,326,972 | A |   | 8/1943  | Rosin            |         |
|-----------|---|---|---------|------------------|---------|
| 5,636,898 | A | * | 6/1997  | Dixon et al.     | 297/316 |
| 5,918,942 | A | * | 7/1999  | Olsen            | 297/423.32 |
| 6,000,758 | A | * | 12/1999 | Schaffner et al. | 297/344.17 |
| 6,227,489 | B1 | * | 5/2001  | Kitamoto et al. | 244/118.5 |
| 6,338,531 | B1 | * | 1/2002  | Hausherr et al. | 297/330 |
| 6,412,870 | B1 | * | 7/2002  | Higgins et al.  | 297/342 |
| 6,491,342 | B1 | * | 12/2002 | Smith            | 297/68  |
| 6,494,536 | B2 | * | 12/2002 | Plant            | 297/284.11 |
| 6,557,934 | B2 | * | 5/2003  | Wiecek           | 297/84  |
| 6,604,791 | B1 | * | 8/2003  | Chen             | 297/330 |

2003/0075966 A1 * 4/2003 Behnert ................. 297/423.26

FOREIGN PATENT DOCUMENTS

| EP | 1 074 468 | 2/2001 |
| FR | 2 776 586 | 10/1999 |
| GB | 2 179 846 | 3/1987 |
| GB | 2 331 007 | 5/1999 |

OTHER PUBLICATIONS

French Preliminary Search Report (2 pp.)

* cited by examiner

Primary Examiner—Peter M. Cuomo
Assistant Examiner—Stephen Vu
(74) Attorney, Agent, or Firm—Blank Rome LLP

(57) ABSTRACT

A seat (1) for a vehicle such as an aircraft, comprises a back rest structure (3) and a squab structure (2) mounted so as to pivot with respect to the back rest structure (3), a structure (5) supporting the squab structure (2) and the back rest structure (3), the back rest structure (3) being connected to the support structure (5) by a pivot connection (10), and a leg rest (4) connected by a pivot connection (6) to the front end of the squab structure (2), characterised in that it comprises mechanical synchronisation mechanism (15) able to synchronise the movements of the back rest structure (3) and of the leg rest (4). The mechanical synchronisation mechanism (15) is connected:

- to the back rest structure (3) by a pivot connection (23) situated at a distance from the pivot connection (10) between the back rest structure (3) and the support structure (5), between the pivot connection (10) and the bottom end (12) of the back rest structure,
- to the leg rest (4) by a pivot connection (24) situated close to the pivot connection (6) between the leg rest and the squab structure, at a certain distance from the latter, and
- to the squab structure (2) by a pivot connection (A) situated close to the pivot connection (6) between the leg rest and the squab structure, at a certain distance from the latter.

16 Claims, 4 Drawing Sheets

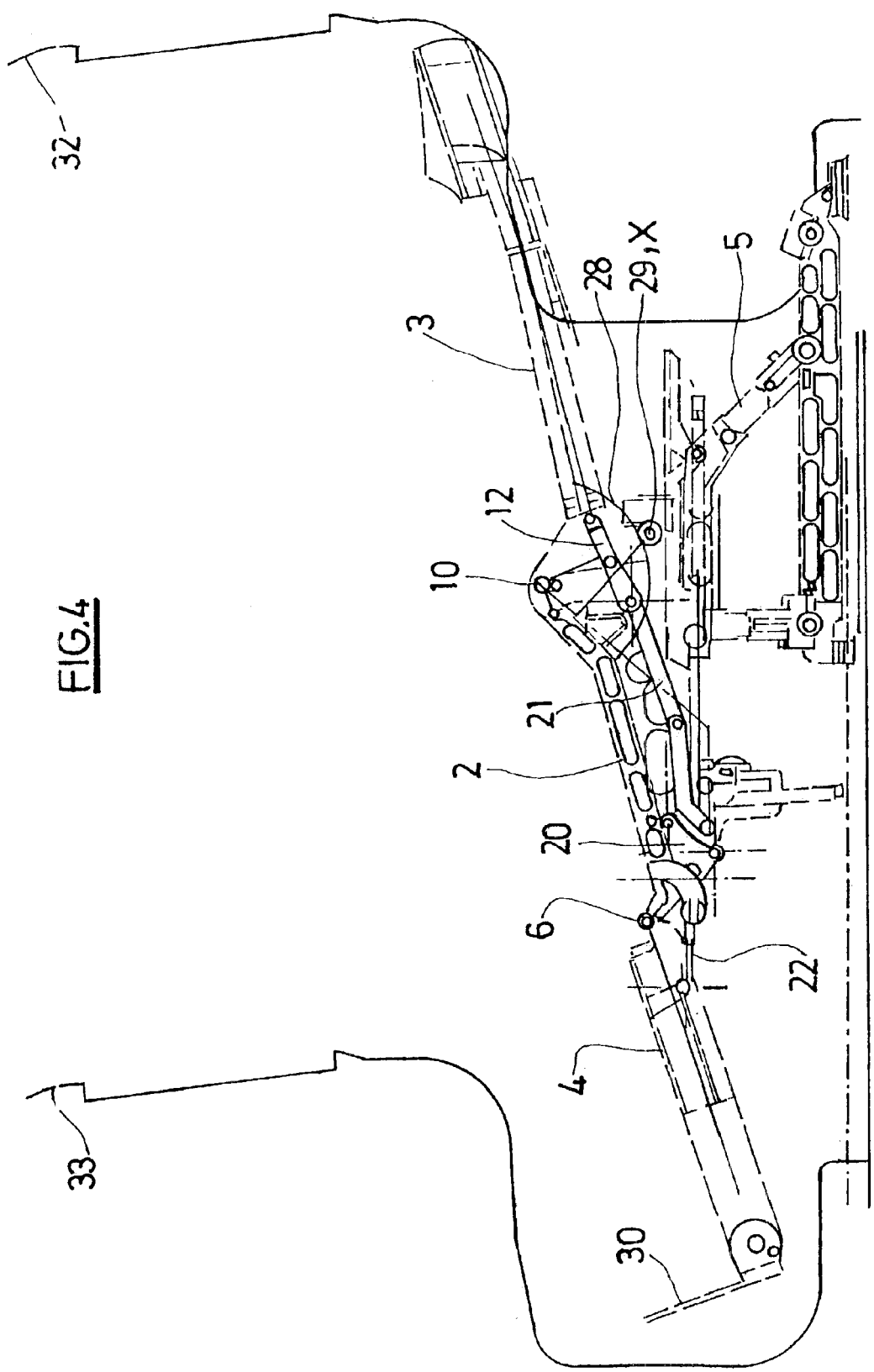

AIRCRAFT SEAT WITH SYNCHRONIZED BACK REST AND LEG REST

BACKGROUND OF THE INVENTION

The invention relates to a seat for an aircraft where the movements of the back rest and leg rest are connected and synchronised.

The document EP-1 044 878 describes a seat comprising a back rest adjustable for inclination, a squab adjustable for inclination, a leg rest adjustable for inclination and a fixed rear separation shell disposed behind the seat back rest, one end of the leg rest being pivotally mounted at the front end of the squab. The side walls of the fixed separation shell comprise runners in which pinions fixed to the back rest can move along with the inclination of the back rest. The movement of the leg rest with respect to the squab is controlled by a programmed processor according to the location of the pinions in the runners. The device controlling the movement of the leg rest is disposed between the squab and the leg rest.

SUMMARY AND OBJECTS OF THE INVENTION

However, in this document, the movements of the leg rest and back rest are synchronised by means of the connection of the movement of the back rest to the shell by means of the runners.

This has a certain number of drawbacks; in particular this synchronisation cannot be achieved for a seat whose elements are independent of the fixed shell or for a seat which does not comprise a fixed shell.

The invention aims to mitigate these drawbacks.

More particularly, the purpose of the invention is to provide a seat where the movements of the back rest and leg rest are mechanically synchronised independently of any fixed shell.

The invention also makes it possible to achieve this synchronisation whilst limiting the number of actuators necessary for obtaining the movements.

To this end, the object of the invention is a seat for a vehicle such as an aircraft, comprising a back rest structure and a squab structure mounted so as to pivot with respect to the back rest structure, a structure supporting the squab structure and the back rest structure, the back rest structure being connected to the support structure by a pivot connection, and a leg rest connected by a pivot connection to the front end of the squab structure, the said seat comprising mechanical synchronisation means able to synchronise the movements of the back rest structure and of the leg rest, the said mechanical synchronisation means being connected:

to the back rest structure by a pivot connection situated at a distance from the pivot connection between the back rest structure and the support structure, between the said pivot connection and the bottom end of the back rest structure, to the leg rest by a pivot connection situated close to the pivot connection between the leg rest and the squab structure, at a certain distance from the latter, and to the squab structure by a pivot connection situated close to the pivot connection between the leg rest and the squab structure, at a certain distance from the latter.

In a particular embodiment, the mechanical synchronisation means comprise:

at least one connecting piece comprising three articulation shafts, a first articulation shaft being connected to the squab structure close to the pivot connection between the leg rest and the squab structure, at a certain distance from the latter;

at least one connecting rod, one end of which is pivotally connected to a second articulation shaft of the said connecting piece and the other end of which is pivotally connected to the back rest structure at a distance from the pivot connection between the back rest structure and the support structure, between the said pivot connection and the bottom end of the back rest structure;

at least one link, one end of which is pivotally connected to a third articulation shaft of the said connecting piece and the other end of which is pivotally connected to the leg rest close to the pivot connection between the leg rest and the squab structure, at a certain distance from the latter.

The leg rest is thus connected to the back rest and follows the movement of the latter.

When the back rest moves from a vertical position to an inclined position, the connecting rod moves in the longitudinal direction of the seat, causing the rotation of the connecting piece about its first shaft and consequently the movement of the link and of the leg rest.

It is thus not necessary to provide a leg rest actuator, nor sensors for determining the position of the back rest and/or of the leg rest.

Also in a particular embodiment, the articulation shafts of the connecting piece extend in a direction perpendicular to the longitudinal direction of the seat.

Also in a particular embodiment, the three articulation shafts of the connecting piece are not situated in the same plane.

Also in a particular embodiment, the connecting piece has a substantially triangular shape, the three articulation shafts each being situated in a corner of the said piece.

This arrangement makes it possible to keep the vertical position of the leg rest whatever the inclination of the squab, when the back rest is in the vertical position.

Also in a particular embodiment, the back rest structure comprises side uprights, the bottom end of at least one upright being pivotally connected to the connecting rod.

The connection between the connecting rod and the back rest is thus situated substantially level with the squab when the latter is horizontal, and below the squab when it is inclined. This arrangement avoids the connecting rod being interfered with by the squab.

Also in a particular embodiment, the link is a load-limiting ram.

Thus this ram damps the load borne by the various parts when a high load is exerted on the leg rest (for example by the passenger.

Also in a particular embodiment, the connecting rod extends substantially in the longitudinal direction of the seat, the link extending in a substantially vertical plane containing the connecting rod.

Longitudinal direction means the direction oriented from the part of the leg rest furthest away from the squab towards the part furthest away from the back rest, where a head rest is generally situated.

Also in a particular embodiment, the mechanical synchronisation means comprise two assemblies each formed by a connecting rod, a link and a connecting piece, each disposed on one side of the seat.

The forces applied are thus distributed and balanced on the two side edges of the leg rest.

Also in a particular embodiment, the seat comprises a foot rest able to move in translation with respect to the leg rest, and an actuator controlling the translation of the said foot rest.

Also in a particular embodiment, the support structure comprises a movable top part supporting the squab structure and a fixed bottom part, the said top part being able to move in translation with respect to the bottom part in the longitudinal direction of the seat, the back rest structure being pivotally connected to the said top part.

Also in a particular embodiment, the seat comprises at least one actuator controlling the inclination of the back rest structure with respect to the support structure.

Also in a particular embodiment, the seat comprises at least one actuator controlling the inclination of the squab structure.

Thus this actuator controls both the inclination of the back rest and that of the leg rest, avoiding the presence of an actuator for the leg rest.

In particular, one end of the actuator controlling the inclination of the squab structure can be pivotally connected to the said first articulation shaft of the connecting piece and the other end of the said actuator is pivotally connected to the front part of the support structure.

Also in a particular embodiment, the seat comprises means of controlling the inclination of the back rest structure and of the squab structure.

Also in a particular embodiment, the control means comprise an electronic control box cooperating with the control actuators and also cooperating with means able to be actuated by the user in order to adjust the position of the seat.

Also in a particular embodiment, the adjustment of the movements of the various movable elements of the seat is achieved by regulating the control box and/or the actuators.

BRIEF DESCRIPTION OF THE DRAWINGS

A particular embodiment of the invention will now be described by way of non-limiting example with reference to the accompanying schematic drawings, in which:

FIG. 4 is a schematic representation of the seat in the elongated position.

DETAILED DESCRIPTION OF THE INVENTION

Figure 1:
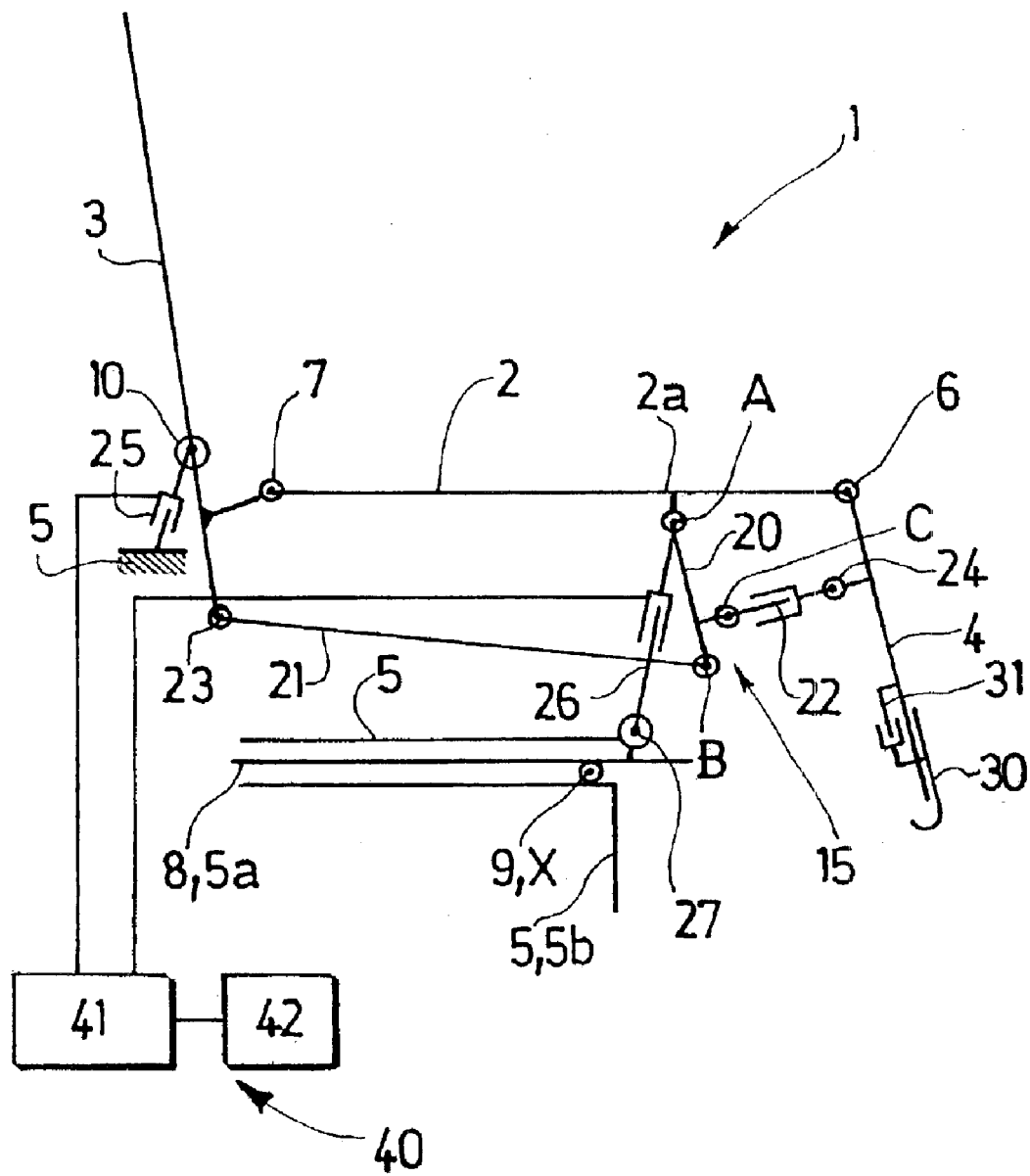
FIG. 1 is a schematic representation of the seat according to the invention.

The seat 1 comprises a squab structure 2, a back rest structure 3, a leg rest structure 4 and a support structure 5 for the squab structure 2 and the back rest structure 3.

One end of the leg rest 4 is connected by a pivot connection 6 to the front end 2a of the squab structure 2.

The other end of the squab structure 2 is mounted so as to pivot with respect to the back rest structure 3 about a shaft 7. This shaft 7 is disposed on the bottom part of the back rest structure 3.

The squab structure 2 is also able to move in translation with respect to the support structure 5 in the longitudinal direction of the seat.

The support structure 5 comprises two parts: a fixed bottom part 5b secured to the floor of the aircraft and a top part 5a supporting the squab structure 2.

The top part 5a is able to move in translation with respect to the fixed bottom part 5b. This runner connection is for example achieved by means of a system of runners or a rack system, controlled by an actuator.

In another embodiment, not shown, the bottom 5b and top 5a parts of the support structure 5 are fixed.

In the embodiment depicted in the figures, the actuation of the movement of the runner is achieved by means of racks 8 fixed to the top part 5a, on each side of the squab structure 2, and pinions 9 disposed on each side of the squab structure 2 on a substantially horizontal shaft X pivotally mounted on the bottom part 5b. The pinions 9 mesh in the racks 8 so as to move them.

An actuator disposed on the shaft X drives the latter in rotation and consequently rotates the pinions 9, thus causing the translation movement of the racks 8.

The back rest structure 3 is connected to the support structure 5 by a pivot connection 10. This pivot connection is situated on the top part 5a of the support structure.

The back rest structure 3 comprises side uprights 11 which extend in the longitudinal direction of the back rest structure 3.

The bottom end 12 of each upright is situated at a distance from the pivot connection 10 of the back rest structure, so that it is situated below the level of the squab structure 2. This bottom end 12 can be in one piece with the upright 11 or be formed by a piece fixed to the upright 11.

The mechanical synchronisation means 15 comprise, on each side of the seat, a connecting piece 20 connected to a connecting rod 21 and a link 22.

The connecting piece 20 comprises three articulation axes A, B, C, which extend in a direction perpendicular to the longitudinal direction of the seat 1.

In particular, the three articulation axes of the connecting piece are not situated in the same plane.

The connecting piece 20 has for example a substantially triangular shape, the three articulation axes A, B, C each being situated in a corner of the said piece.

The connecting rod 21 extends substantially in the longitudinal direction of the seat, the link 22 extending in a substantially vertical plane containing the connecting rod 21 and the connecting piece 20.

The connecting piece 21, the link 22 and the connecting piece 20 are thus disposed below the surface of the squab structure 2, between the squab structure 2 and the support structure 5.

The first articulation axis A is connected to the squab structure 2 close to the pivot connection 6 between the leg rest 4 and the squab structure 2, at a certain distance from the latter.

The second articulation axis B of the connecting piece 20 is connected to one end of the connecting rod 21.

The other end of the connecting rod 21 is connected by a pivot connection 23 to the bottom end 12 of the upright 11 of the back rest structure 3, at a distance from the pivot connection 10 between the back rest structure 3 and the support structure 5, between the said pivot connection 10 and the bottom end 12 of the back rest structure.

The third articulation axis C of the connection piece 20 is connected to one end of the link 22.

The other end of the link 22 is connected by a pivot connection 24 to the leg rest 4 close to the pivot connection 6 between the leg rest 4 and the squab structure 2, at a certain distance from the latter.

The link 22 can be a load limiting ram. It may for example be a gas ram of the "brake over" type which functions like a simple link and compresses when the leg rest 4 is under overload in order to relieve it.

The inclination of the back rest structure 3 by rotation about the pivot connection 10 is controlled by at least one control actuator 25 connected to the support structure 5.

The inclination of the back rest structure 3 is effected by gears comprising a gear sector 28 and a pinion 29.

A gear sector 28 is disposed on each side of the back rest structure 3 and a substantially horizontal shaft X, fixed in a pivot connection to the top part 5a, carries a pinion 29 on each side of the back rest, each pinion 29 coming into engagement with a gear sector 28. The shaft X is motorised by the rotary actuator 25.

This shaft X is common with the axis controlling the translation of the top part 5a of the support structure 5. The inclination of the back rest structure 3 is thus synchronised with the translation of the squab structure 2.

The inclination of the squab structure 2 by rotation about the pivot connection 7 is controlled by two actuators 26.

One end of each actuator 26 is pivotally connected to the first articulation axis A of the connection piece 20, its other end being connected to the front part of the support structure 5 by a pivot connection 27.

The actuators 26 are disposed on each side of the squab structure 2 and are oriented from the front of the support structure 5 towards the top and front of the squab structure 2.

The seat 1 also comprises a foot rest 30 able to move in translation with respect to the leg rest 4, so that the total length of the leg rest 4 and foot rest 30 can be adjusted by the passenger within the space available. The movement of the leg rest 30 is controlled by an actuator 31.

Provision can also be made for the movements of a head rest and/or possibly other movable elements of the seat to be controlled by actuators.

Figure 2:
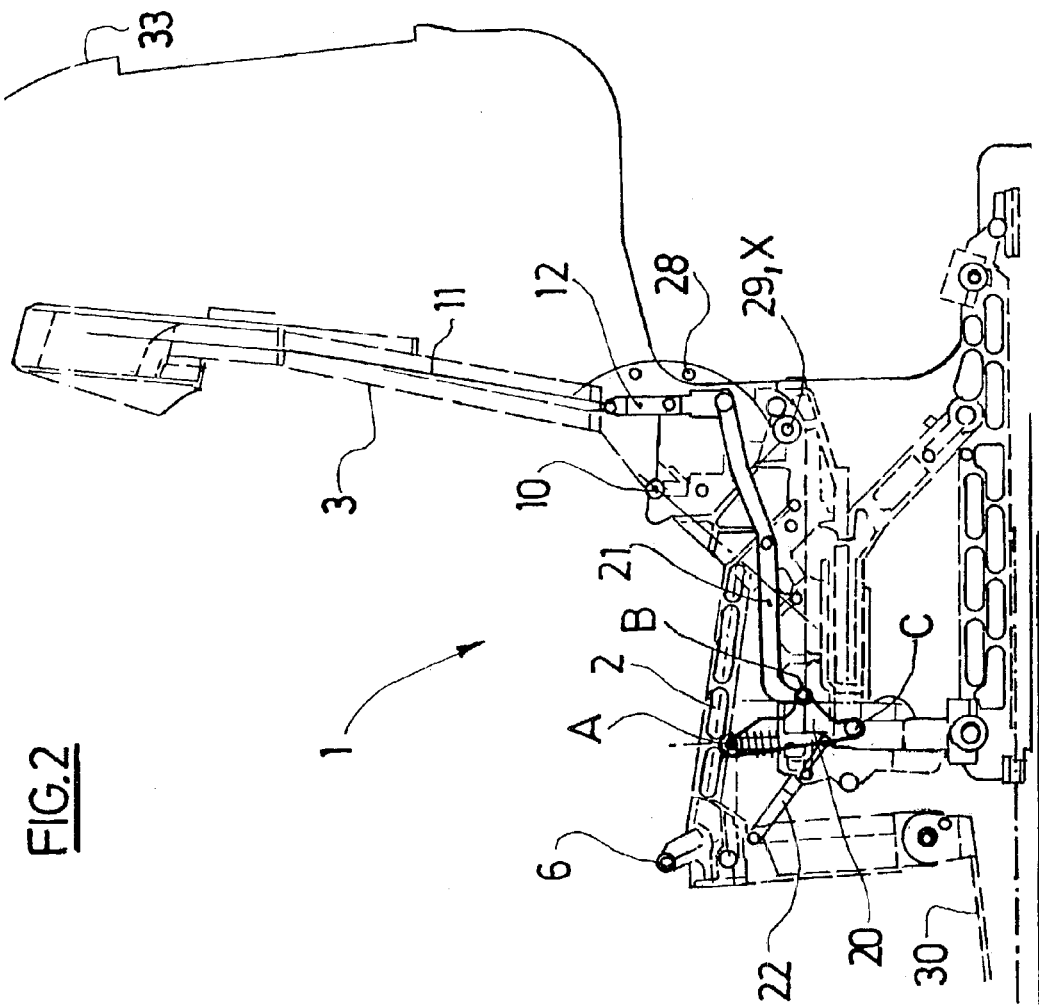
FIG. 2 is a schematic representation of the seat in the take-off position, the back rest being in the vertical position.
Figure 3:
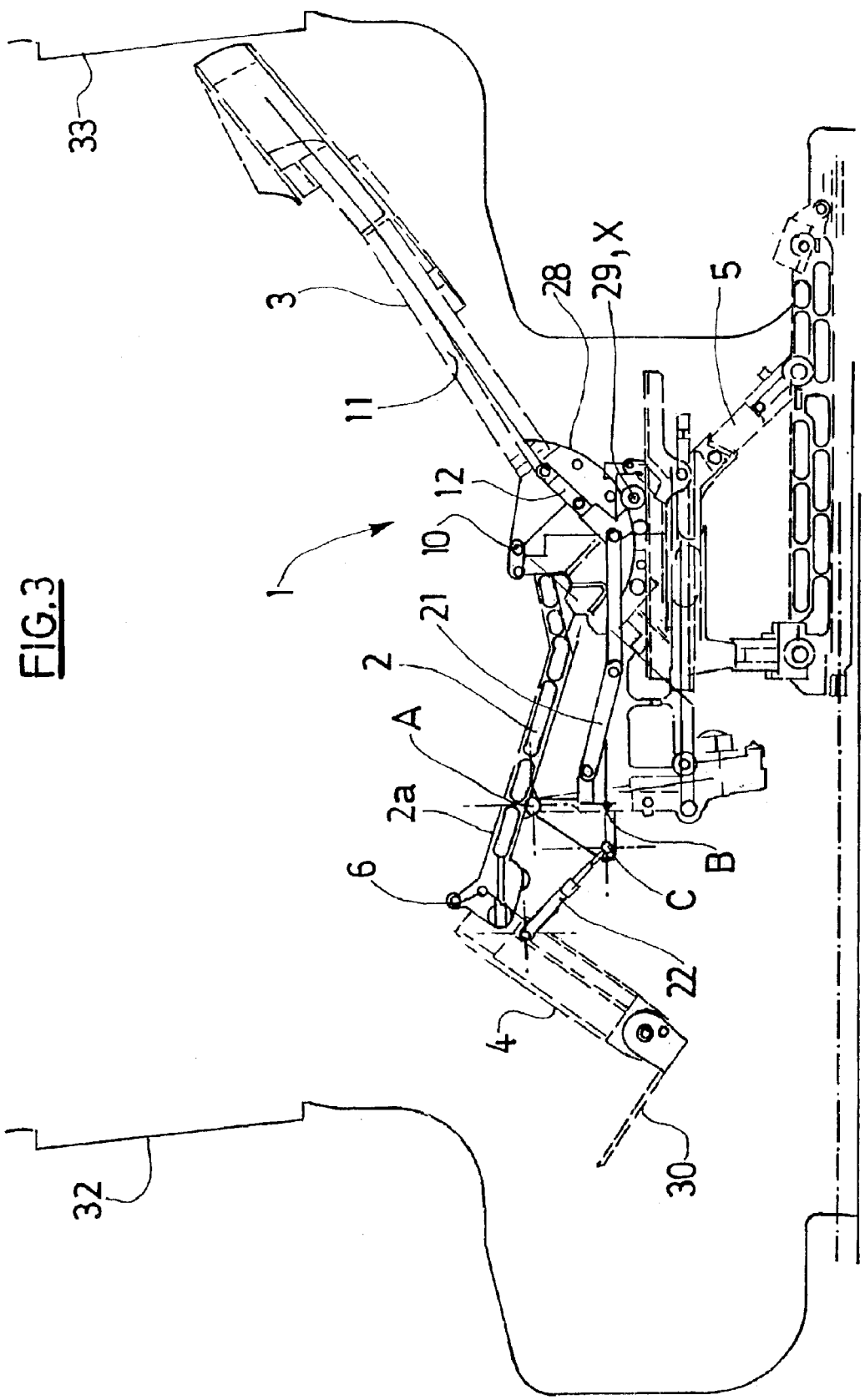
FIG. 3 is a schematic representation of the seat in the inclined position.

The seat 1 can be situated in a space lying between a fixed front separation shell 32 and a fixed rear separation shell 33, depicted in FIGS. 2 to 5.

These fixed separation shells 32, 33 are fixed and secured to the aircraft floor. They thus delimit a space in which the seat 1 can be moved. The distance between two fixed shells 32, 33 is variable according to the distribution of the seats within the aircraft.

The movements of the squab 2, back rest 3 and support structure 5 are completely independent of the separation shells 32, 33.

These shells 32, 33 can in particular serve as a tray support or video screen for the passenger.

The seat 1 also comprises control means 40 which also comprise an electronic control box 41 cooperating with the actuators and also cooperating with means 42 which can be actuated by the user to adjust the position of the seat.

This electronic control box 41 may be programmable.

The means 42 are for example a series of control knobs or handles for controlling the movement of the various movable elements of the seat 1.

In the space defined by two separation shells 32, 33, the control means 40 of the seat enable it to adopt, between a straight take-off or landing position of the seat and an elongated position of the seat, various positions allowed by the space included between the said fixed front separation shell 32 and the said fixed rear separation shell 33.

When the distance between two separation shells 32, 33 varies from one seat installation to another, the limitations for avoiding interfere with the environment of the seat consist solely of restrictions on the motorisation, the control means remaining identical.

It is thus possible to define an envelope delimiting the movements of the seat allowed by the restrictions on the motorisation. This envelope is defined by at least two extreme points of the seat 1, such as the end of the leg rest 4 or of the foot rest 30 when it is present and the end of the head rest.

The restrictions on the motorisation are such that the envelope does not interfere with the environment of the seat such as the separation shells 32, 33 and possibly the aircraft floor in order to avoid damaging the leg rest 4 or foot rest 30.

The extreme movements of the various movable elements of the seat 2, 3, 4, 30 according to the shape and/or the distance between the two separation shells 32, 33 are adjusted simply by regulating the control box 41 and/or the various actuators, without modifications to elements of the seat structure or of the kinematics.

These actuators are for example each controlled with a copying of position to the programmable control box 41. By modifying the programming of this box 41, the envelope of the permitted movements of the seat are varied according to the shape and/or the relative position of the separation shells 32, 33.

It is also possible to place stops in order to limit the various movements. Other equivalent means can also be used for limiting the movements.

The inclination of the leg rest 4 as a function of the inclination of the back rest structure is now described in detail.

When the back rest structure 3 is in the vertical position (FIG. 2), the leg rest 4 is also in a substantially vertical position. The axes A and C of the connecting piece 20 are situated substantially one above the other, the link 22 is oriented from the axis B, upwards and towards the front of the squab structure 2 in the direction of the leg rest 4.

When the back rest structure 3 moves from the vertical position to an inclined position under the action of the actuator 25 (FIG. 3), the tilting of the ends 12 of the uprights 11 of the back rest 3 causes the movement of the connecting rod 21 in the direction of the leg rest 4. This movement causes the rotation of the connecting piece 20 about its axis A in the direction of the leg rest 4, causing the movement of the link 22 towards the leg rest 4 and therefore the movement of the latter.

This latter movement can be continued until the back rest structure 3 is completely inclined (FIG. 4), the surfaces of the leg rests 4, squab 2 and back rest 3 then being in line with one another.

The lengths of the connecting rod 21 and link 22 and the dimensions of the connecting piece 20 are such that the leg rest 4 and back rest 3 are always substantially parallel.

Moreover, this arrangement also, when the back rest is in the vertical position, keeps the vertical position of the leg rest whatever the inclination of the squab.

When the back rest is inclined, the synchronisation movements lower the leg rest when the squab structure is raised. This avoids interference with the front shell or the seat situated in front.

The inclination of the squab 2 being controlled by the actuator 26, the connecting piece 20 then turns about its second axis B.

What is claimed is:

1. A seat for a vehicle comprising:

a back rest structure (3);

a squab structure (2) mounted so as to pivot with respect to the back rest structure (3);

a structure (5) supporting the squab structure (2) and the back rest structure (3), the back rest structure (3) being connected to the support structure (5) by a pivot connection (10), the support structure having a movable top part (5a) supporting the squab structure (2) and a fixed bottom part (5b), the top part (5a) being able to move in translation with respect to the bottom part (5b) in the longitudinal direction of the seat, and the back rest structure being pivotally connected to the top part (5a);

a leg rest (4) connected by a pivot connection (6) to the front end of the squab structure (2); and a mechanical synchronization means (15) able to synchronize the movements of the back rest structure (3) and of the leg rest (4), the synchronization means (15) including, at least one connecting rod articulated with the back rest structure (3) by a pivot connection (23) situated at a distance from the pivot connection (10) between the back rest structure (3) and the support structure (5), between the pivot connection (10) and the bottom end (12) of the back rest structure, and at least one connecting piece having three articulation shafts, the first articulation shaft being connected to the squab structure close to the pivot connection between the leg rest and the squab structure, the second articulation shaft being pivotally connected to one end of the connecting rod, and the third articulation shaft being pivotally connected to one end of at least one link and the other end of the link being pivotally connected to the leg rest (4) by a pivot connection (24) situated close to the pivot connection (6) between the leg rest and the squab structure.

2. The seat according to claim 1, wherein the articulation shafts of the connecting piece (20) extend in a direction perpendicular to the longitudinal direction of the seat.

3. The seat according to claim 1, wherein the three articulation shafts (A, B, C) of the connecting piece (20) are not situated in the same plane.

4. The seat according to claim 1, wherein the connecting piece (20) has a substantially triangular shape, the three articulation shafts (A, B, C) each being situated in a corner of said piece (20).

5. The seat according to claim 1, wherein the back rest structure (3) includes side uprights (11), the bottom end (12) of at least one upright being pivotally connected to the connecting rod (21).

6. The seat according to claim 1, wherein the link (22) is a load-limiting ram.

7. The seat according to claim 1, wherein the connecting rod (21) extends substantially in the longitudinal direction of the seat, the link (22) extending in a substantially vertical plane containing the connecting rod (21).

8. The seat according to claim 1, wherein the mechanical synchronization means (15) includes two assemblies each formed by the connecting rod (21), the link (22) and the connecting piece (20), wherein each is disposed on one side of the seat.

9. The seat according to claim 1, wherein the seat includes a foot rest (30) able to move in translation with respect to the leg rest (4), and an actuator (31) controlling the translation of the said foot rest.

10. The seat according to claim 1, wherein the seat includes at least one actuator (25) controlling the inclination of the back rest structure (3) with respect to the support structure (5).

11. The seat according to claim 10, wherein the seat includes control means comprising an electronic control box (41) cooperating with at least one control actuator (25) and also cooperating with a means (42) actuated by the user in order to adjust the position of the seat (1).

12. The seat according to claim 11, wherein the adjustment of the movements of the various movable elements (2, 3, 4) of the seat is achieved by regulating at least one of the control box (41) and at least one actuator (25).

13. The seat according to claim 1, wherein the seat includes at least one actuator (26) controlling the inclination of the squab structure (2).

14. The seat according to claim 13, wherein one end of the actuator (26) controlling the inclination of the squab structure (2) is pivotally connected to the said first articulation shaft (A) of the connecting piece (20) and the other end of the said actuator (26) is pivotally connected to the front part of the support structure (5).

15. The seat according to claim 1, wherein the seat includes means (40) of controlling the inclination of the back rest structure and of the squab structure.

16. The seat for a vehicle comprising a back rest structure;

a squab structure mounted so as to pivot with respect to the back rest structure;

a structure supporting the squab structure and the back rest structure, the back rest structure being connected to the support structure by a pivot connection, and the support structure having a movable top part supporting the squab structure and a fixed bottom part, the top part being able to move in translation with respect to the bottom part in the longitudinal direction of the seat, and the back rest structure being pivotally connected to the top part;

a leg rest connected by a pivot connection to the front end of the squab structure; and a mechanical synchronization means able to synchronize the movements of the back rest structure and of the leg rest, the synchronization means being connected to the back rest structure by a pivot connection situated at a distance from the pivot connection between the back rest structure and the support structure, between the pivot connection and the bottom end of the back rest structure, to the leg rest by a pivot connection situated close to the pivot connection between the leg rest and the squab structure, and to the squab structure by a pivot connection situated close to the pivot connection between the leg rest and the squab structure.

* * * * *